United States Patent [19]
Lindsay, Jr.

[11] 3,827,332
[45] Aug. 6, 1974

[54] AIRCRAFT HAVING RECOILLESS RIFLE

[76] Inventor: David B. Lindsay, Jr., 1460 Gulfview Dr., Sarasota, Fla. 79335

[22] Filed: Oct. 31, 1972

[21] Appl. No.: 302,451

[52] U.S. Cl. .................................. 89/1.7, 89/37.5 C
[51] Int. Cl. ............................................. F41f 3/02
[58] Field of Search ..... 89/1.7, 1.701, 1.702, 37.56, 89/1.816, 1.817, 37.5 R

[56] References Cited
UNITED STATES PATENTS

| | | | |
|---|---|---|---|
| 2,737,853 | 3/1956 | Grauenhorst et al. | 89/37.5 L |
| 2,763,189 | 9/1956 | Grill | 89/1.817 |
| 2,956,479 | 10/1960 | Musser | 89/1.7 |
| 3,018,692 | 1/1962 | Bilek | 89/1.815 |

FOREIGN PATENTS OR APPLICATIONS

| | | | |
|---|---|---|---|
| 597,391 | 4/1925 | France | 89/1.701 |

*Primary Examiner*—Samuel W. Engle
*Attorney, Agent, or Firm*—Browne, Beveridge, DeGrandi & Kline

[57] ABSTRACT

A single-fuselage fixed wing aircraft is provided with a recoilless rifle at the outer portions of the wing. The large caliber recoilless rifle has a rearwardly directed exhaust nozzle which emits a recoil-balancing blast of high velocity propellant gases into an area which is spaced from the tail structure of the aircraft.

4 Claims, 7 Drawing Figures

PATENTED AUG 6 1974
3,827,332
SHEET 1 OF 2
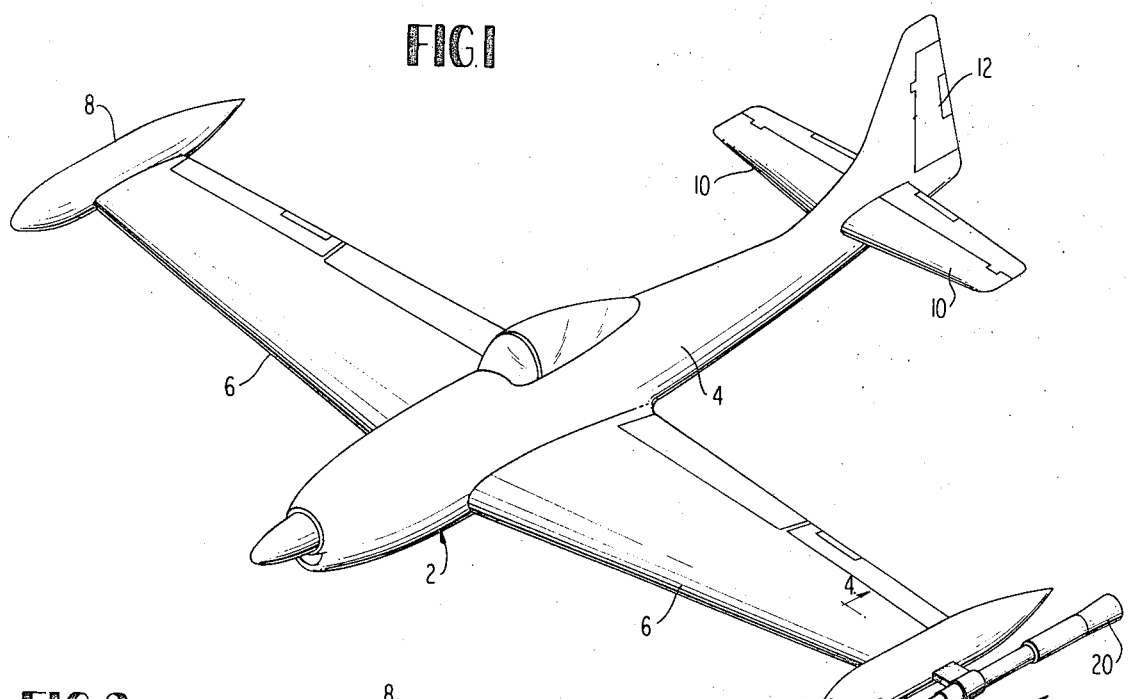
FIG.1
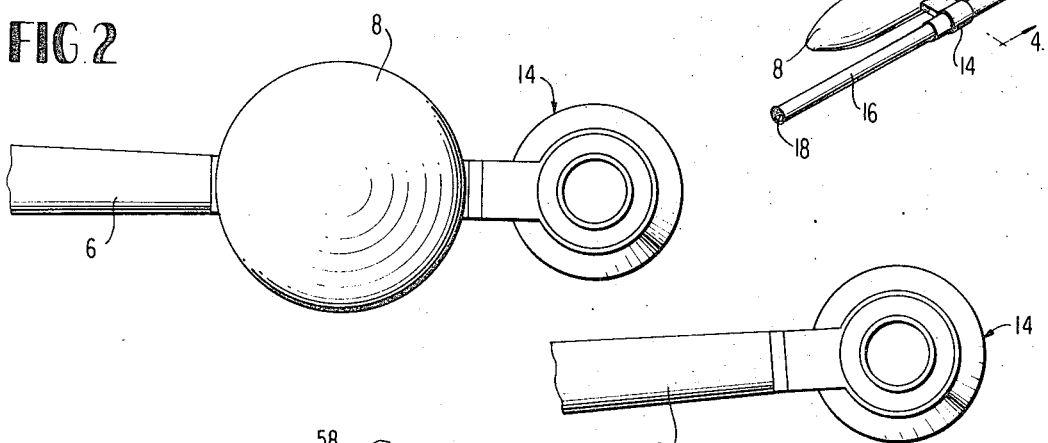
FIG.2
FIG.3
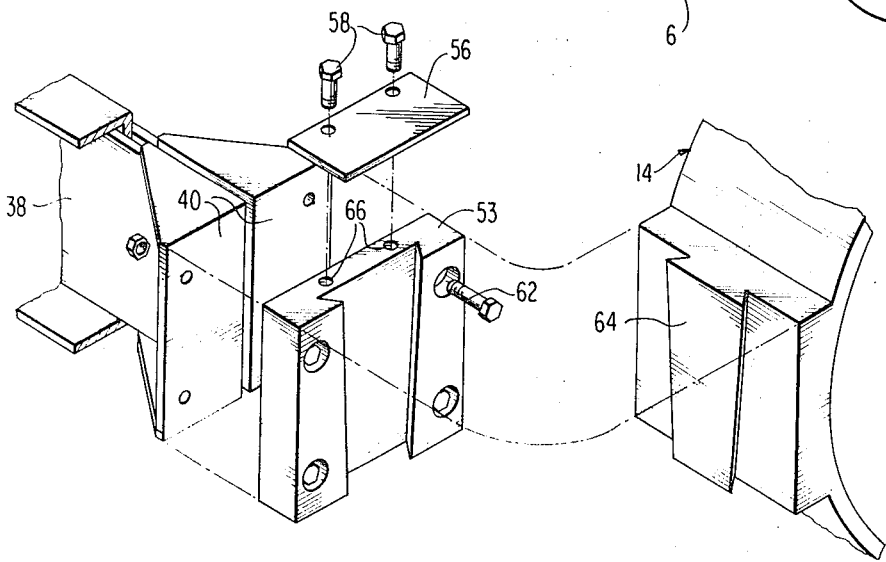
FIG.7

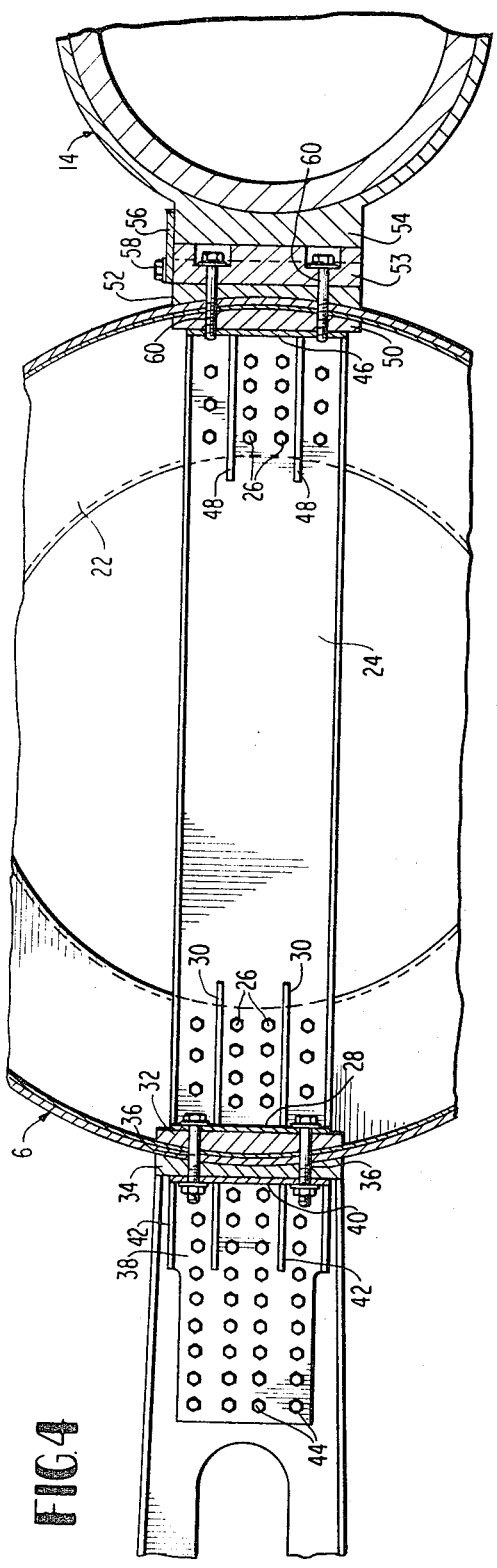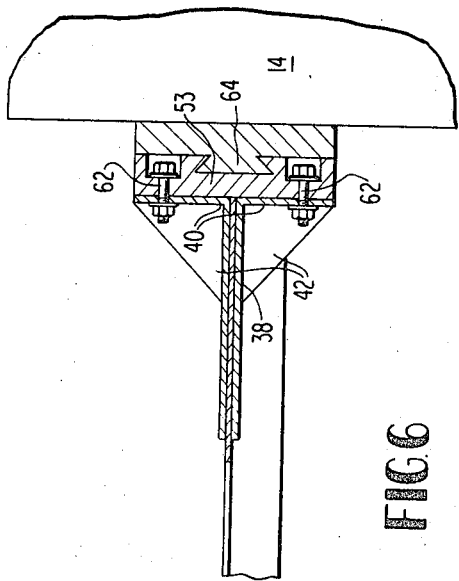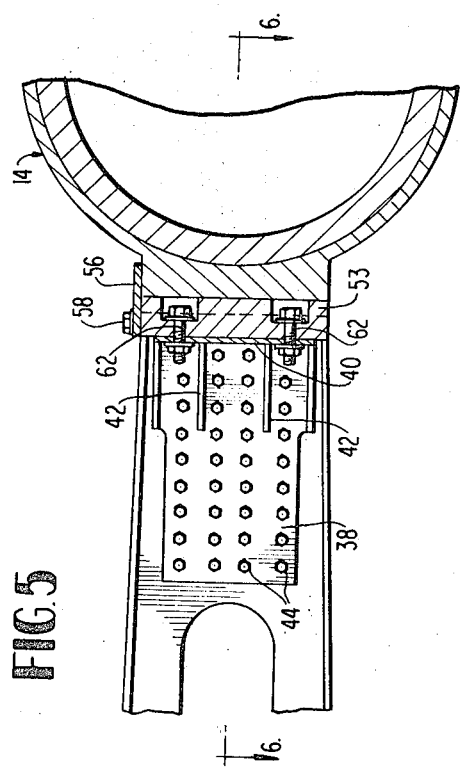

AIRCRAFT HAVING RECOILLESS RIFLE

This invention relates to aircraft having the capability of delivering accurately-directed projectiles of large caliber without subjecting the airframe itself either to substantial impact forces typical of closed breech guns or to the blast of recoil-balancing propellant gases generated by recoilless rifles.

Prior to this invention, it has been recognized that recoilless rifles may be mounted on aircraft if precautions are taken to ensure that the recoil-balancing propellant gases do not impinge upon any portion of the aircraft to produce blast damage. This history is accurately reflected in the publication entitled "Development of Recoilless Rifles" published by Harvey Engineering Laboratories, Torrance, Calif., under the preliminary designation HA–2441C. This latter publication is incorporated into this specification by reference.

Prior to this invention, emphasis had been placed on redesigning the aircraft itself, usually calling for a modification of the tail structure so it would not be struck by the recoil-balancing gases. Other efforts have been directed toward a side-firing recoilless rifle or recoilless rifles mounted in pods on the bomb racks of conventional aircraft.

According to the present invention, a recoilless rifle is mounted on the end portion of the wing of a fixed wing aircraft. The rifle is oriented parallel to the fuselage and its rearwardly directed exhaust nozzle emits the recoil-balancing blast of high velocity gases into an area which is spaced from the tail structure, so as to prevent any damage to the aircraft structure when the rifle is fired.

A more complete understanding of a preferred embodiment of the invention may be had by referring to the accompanying drawings wherein FIG. 1 is a perspective view of an aircraft having a single recoilless rifle mounted outboard of the wing tip fuel tank;

FIG. 2 is a front elevational view of the outer wing structure and rifle shown in FIG. 1; and, FIG. 3 is a rear elevational view thereof;

FIG. 4 is a sectional view taken through the wing structure, wingtip fuel tank and the mounting bracket for the recoilless rifle, illustrating the structural members which provide the strength necessary for such a mounting arrangement;

FIG. 5 is a sectional view showing the recoilless rifle mounted directly on the wing, without an interposed wingtip fuel tank;

FIG. 6 is a further sectional view thereof taken along the line 6—6 in FIG. 5; and, FIG. 7 is a perspective view showing the mounting structure of FIGS. 5 and 6.

Referring to FIG. 1, it will be seen that there is a conventional aircraft 2 having a fuselage 4 and laterally extending fixed wings 6, each of which has a wingtip fuel tank 8 at its outer end. At the rear of the fuselage, there is an empenage or tail structure of conventional construction having horizontal stabilizers 10 and a vertical stabilizer 12.

At the outer end of the port wing 6, there is a mounting bracket 14 which supports a recoilless rifle 16. Preferably, the recoilless rifle is of relatively large caliber such as the 106-mm. Recoilless Rifle M40A1 which is well known and is described in the Army Field Manual FM 23-82 of May, 1964, which is incorporated herein by reference.

The rifle 16 is oriented parallel to the fuselage 4 and it has a forwardly-directed muzzle 18 for the projectile. At the rear end of the rifle 16 is a nozzle assembly 20 which emits a diverging jet stream or blast of propellant gases which balances the rearwardly-directed thrust and impact created by firing the projectile. The blast produced by the nozzle is concentrated in a blast area which is somewhat conical and symmetrical with respect to the axis of the rifle 16 and has an apex angle of at least about 40°. The dimensions of the wing 6, wingtip fuel tank 8 and bracket 14 are such that the blast area is spaced from the tail structure so that no damage will occur to the tail structure.

In the embodiment of FIGS. 1–4 the bracket 14 for the rifle 16 is connected to a wingtip fuel tank 6. FIG. 4 shows the fuel tank 6 as having annular transverse reinforcing ribs 22 and a diametrical beam 24 which is attached to a rib 22 by a plurality of bolts or other fasteners 26. Somewhat similar wingtip tank reinforcement structure is disclosed in U.S. Pat. No. 3,147,941 granted Sept. 8, 1964 to Q. J. Hawthorne. However, unlike this previous structure, the reinforcing beam in the present invention extends entirely across the internal structure of the wingtip tank where it is physically connected to the bracket assembly for the recoilless rifle.

As seen in FIG. 4, the beam 24 in the tank has an inboard flange 28 which is braced to the beam 24 by the ribs 30. A contoured internal spacer 32 lies between the wall of the tank and the flange 28; and, a concavely contoured spacer 34 lies against the exterior surface of the wingtip tank 6. The bolts 36 connect the flange 28 and tank 26 to the outermost end portion of the aircraft wing, the latter being provided with an internal reinforcing plate 38, a vertical flange 40 and ribs 42 which brace the flange 40 with respect to the plate 38. The plate 38 is attached to the internal structural members of the wing by a plurality of bolts or other fasteners 44.

At the outboard side of the wingtip tank 6, there is an internal flange 46 which is connected to the beam 24 and braced thereto by the ribs 48. A convexly contoured spacer 50 lies between the flange 46 and the internal wall of the tank 6. An external spacer 52 lies between the outside of the tank and a connector plate 53 which mates by a dovetail connection with the portion 54 of the rifle-supporting bracket 14. Details of this arrangement will be explained in a later portion of the specification, but it presently will be seen that a retainer plate 56 is held in place by a bolt 58 to hold the bracket 14 to the plate 53. The external spacer 52 and the connector plate 53 are attached to the tank by the bolts 60.

In instances where the aircraft has no wingtip fuel tank, the recoilless rifle may be mounted on the aircraft by the arrangement shown in FIGS. 5, 6 and 7. The wing structure itself is identical to that shown in FIG. 4, but in lieu of the contoured spacer 34, there is provided a connector plate such as that designated 53 in FIG. 4. This connector plate abuts the outer surface of the wing and is held to the flange 40 by the bolts 62. As illustrated best in FIG. 7, the connector plate 53 has a tapered dovetail slot in its face for receiving the similarly-configured dovetail projection 64 on the bracket 14 for the rifle. It will be evident that the plate 53 is initially attached to the wing structure by the bolts 62. Then, the dovetail projection 64 on the gun supporting bracket 14 is inserted in the dovetail slot in the mounting plate 53 so that the plate 53 and the bracket 14 are horizontally aligned. The retaining plate 56 is then attached to the plate 53 by the bolts 58 which are received in the threaded apertures 66 of the mounting plate 53. The retaining plate 56, of course, prevents separation between the mounting plate 53 and the bracket 14.

From the foregoing description, it will be appreciated that the disclosed invention represents a step forward in the art since it enables the mounting of a recoilless rifle on a conventional aircraft in a manner which ensures that the aircraft structure will not be damaged by the recoil-balancing blast of rearwardly directed gases. Furthermore, this represents an uncomplicated and expeditious manner of providing relatively light aircraft with substantial firepower capable of accurate direction. These advantages may be realized by many different variations of the invention other than the disclosed embodiments, so it is emphasized that the invention is not limited only to the disclosed embodiments but is instead set forth in the claims which follow.

I claim:

1. An aircraft comprising an airframe having laterally extending wings and a fuselage with a tail structure centrally located at the rear end thereof, a recoilless rifle mounted outboard of the end portion of the wing and being oriented generally parallel to the fuselage, said recoilless rifle being mounted at the outer end of one of said wings and having a forwardly-directed muzzle and a rearwardly directed exhaust nozzle means for expelling into a blast area, a diverging recoil-balancing blast of high velocity propellant gases, said blast area being spaced from the tail structure, a wingtip fuel tank located outboard of the wing and inboard of the recoilless rifle, said fuel tank having internal structural reinforcement means at the locations where it is connected to the wing and to the recoilless rifle, said internal reinforcement means including a structural member which extends transversely through the fuel tank, a connector plate located outside the fuel tank and attached to the outer end of the internal structural reinforcement, and means for supporting the recoilless rifle from the connector plate.

2. The aircraft of claim 1 wherein the rearward exhaust nozzle means produces a blast which extends at least about forty degrees from the longitudinal axis of the recoilless rifle.

3. The aircraft of claim 1 wherein the nozzle means produces a blast area which is generally conical and has its apex at the rear end of the nozzle, said conical blast area being generated about the longitudinal axis of the recoilless rifle and having an apex angle of about sixty degrees.

4. The aircraft of claim 1 wherein means are provided for mounting the connector plate directly at the outer end of the wing structure, whereby the fuel tank may be removed to permit the connector plate and the recoilless rifle to be attached directly to the wing structure.

* * * * *